UNITED STATES PATENT OFFICE.

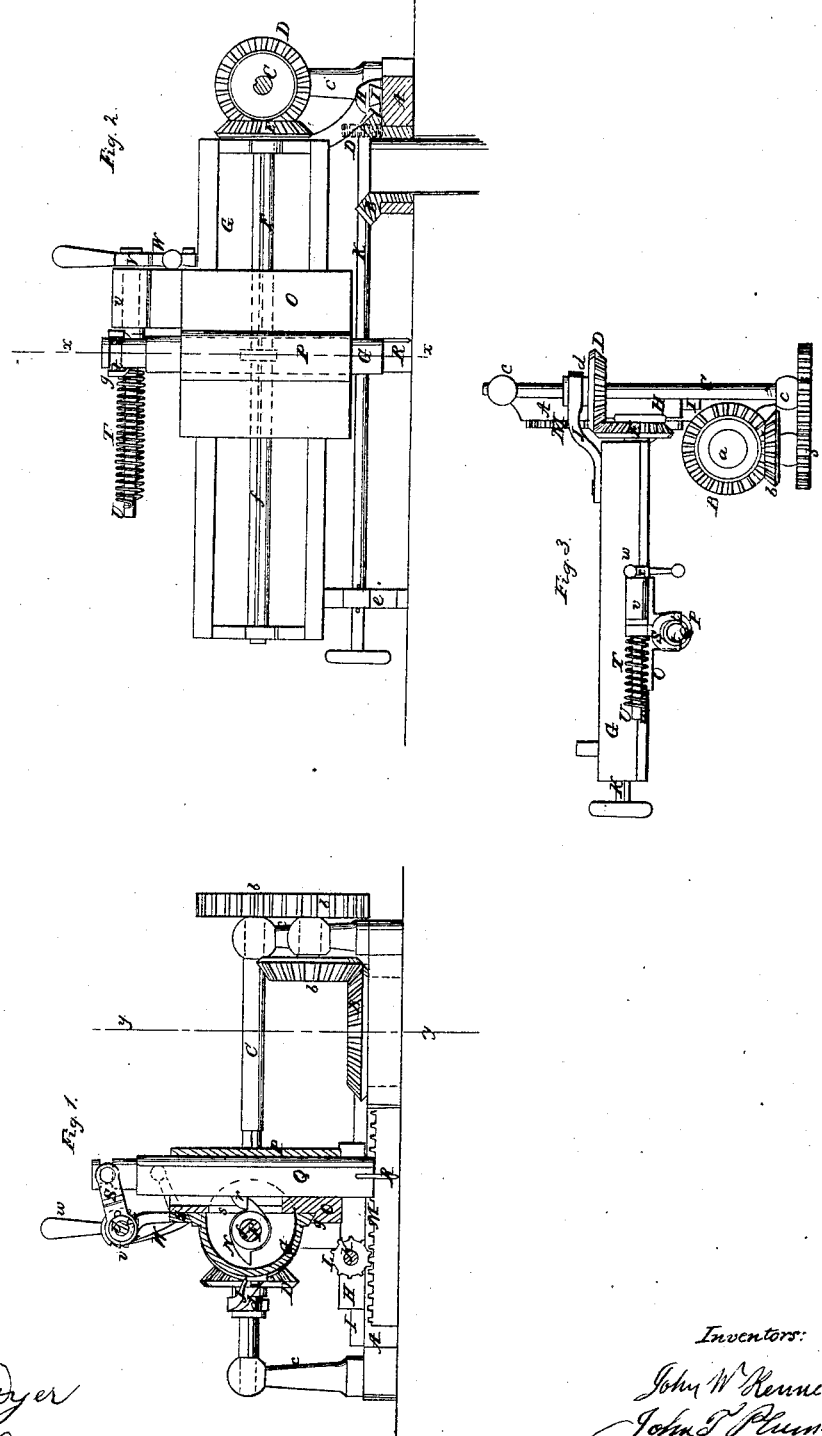

JOHN W. KENNEDY AND JOHN T. PLUMMER, OF PLAINFIELD, CONNECTICUT.

MACHINE FOR DRESSING MILLSTONES.

Specification of Letters Patent No. 24,742, dated July 12, 1859.

*To all whom it may concern:*

Be it known that we, JOHN W. KENNEDY and JOHN T. PLUMMER, both of Plainfield, in the county of Windham and State of Connecticut, have invented a new and Improved Implement or Device for Dressing and Picking Millstones; and we do hereby declare that the following is a full, clear, and exact description of the same, reference being had to the annexed drawings, making a part of this specification, in which—

Figure 1, is a vertical section of our invention taken in the line $x$, $x$, Fig. 2. Fig. 2, is a vertical section of ditto, taken in the line $y$, $y$, Fig. 1. Fig. 3, is a plan or top view of ditto.

Similar letters of reference indicate corresponding parts in the several figures.

To enable those skilled in the art to fully understand and construct our invention we will proceed to describe it.

A, represents a metal bar to which a horizontal bevel toothed wheel B, is attached. This wheel B, is fitted in a suitable bearing and is of annular form, or, has an opening $a$, at its center to receive the spindle which operates the machine so far as the movement of the pick is concerned. The bevel wheel B, is connected by a system of gearing $b$, with a horizontal shaft C, which has its bearings in the upper parts of standards $c, c$, attached to the bar A, one near each end, see Figs. 1 and 3. The shaft C, has a bevel toothed wheel D, fitted loosely on it and allowed to slide thereon, but at the same time made to turn with the shaft by means of a feather and groove usually employed for such purpose.

The wheel D, gears into a corresponding wheel E, which is attached to one end of a shaft F, that is fitted in a semi-cylindrical case G, one end of which has a guide bar H, attached that is fitted on a way I, on the bar A, the way I, and the groove in the guide bar H, being of dove-tail form, as shown clearly in Fig. 2. The wheel D on the shaft C, is connected to the case G, by an arm J, the outer end of said arm fitting loosely over a collar $d$, on said wheel. See Figs. 1 and 3.

K, is a shaft one end of which has its bearing in the guide bar H, the other bearing at the opposite end being attached to an upright $e$, which supports the outer part of the case G, see Fig. 2. On the end of the shaft K, adjoining the guide bar H, a pinion L, is placed, said pinion gearing into a rack M, on bar A.

The shaft F, is grooved longitudinally as shown at $f$, Fig. 2, and on said shaft a wiper N, is placed and allowed to slide freely thereon, but made to turn with the shaft in consequence of a feather in the wiper fitting in the groove. To the side of the case G, a vertical plate $o$, is attached by means of dove-tail projections $g$, at its top and bottom, said projections $g$, fitting over the upper and lower edges of the case G, as shown clearly in Fig. 1. To the plate O, a vertical tube is attached in which an arbor Q, is placed, said arbor having a pick R, attached to its lower end. To the arbor Q, a projection $r$, is attached and against which the wiper N, acts through a slot $s$, as shown clearly in Fig. 1.

The upper part of the arbor Q, is grooved circumferentially and receives pins $t$, of a forked arm S, which is connected to the inner end of a spiral spring T, that is placed on a shaft U, the opposite end of the spring T, being attached to the shaft at its outer end, as shown at $u$. The shaft U, is fitted in a bearing $v$, on the upper end of the plate O, and to the inner end of said shaft a ratchet V, is attached, said ratchet having a handle $w$, attached to it, and to the side of the plate O, just below the ratchet V, a bent pawl W, is attached, said pawl being loaded so as to have a tendency to keep engaged with the ratchet V,—see more particularly Fig. 1.

The operation is as follows: The implement is placed on the face of the stone and the wheel B, fitted on the spindle, that passes through the bed stone, the spindle as it rotates, rotating the shaft E, through the medium of the gearing $b$, D, E, the wiper N, raising the pick arbor Q, and the spring T, forcing it down. The bar A, is allowed to turn on the spindle as a center, and the case G, may be moved in a direction parallel with bar A, by turning the shaft K, said movement being effected in consequence of the pinion L, gearing into the rack M. Thus it will be seen that the pick may be adjusted to any part of the face of the stone, the plate O, being movable on the case G, and radial or tangential furrows cut therein. The operator or attendant moves the plate O, by hand, and the strength of the spring T, and consequently the force of the blow of the pick is regulated by turning the shaft U, which causes the spring T, to have greater or less strength. The shaft U, is prevented from casually turning by means of the ratchet V, and pawl W. The operator actuates the ratchet V, and pawl W, as occasion may require to regulate the force of the blow of the pick. This is an important improvement for in picking mill stones it is necessary that the hard portions of the stone be cut a trifle lower than the softer places in order to compensate for the rapid wear of the latter. It is also essential that in cutting deep furrows or ridges the blows be stronger than in cutting shallow ones, in order to expedite the work.

Having thus described our invention what we claim as new and desire to secure by Letters Patent, is—

The arrangement and combination of the arbor Q, forked arm (S) spring T, shaft U, ratchet and pawl V, W, wiper N, bar A, movable case G, shaft K, and adjustable plate O, as and for the purpose herein shown and described.

JOHN W. KENNEDY.
JOHN T. PLUMMER.

Witnesses:
WILLIAM DYER,
KIMBALL KENNEDY.